April 23, 1935.　　　J. N. HADJISKY　　　1,998,671

INSULATING AIR CELL

Original Filed Jan. 16, 1933　　7 Sheets-Sheet 1

INVENTOR.
JOSEPH N. HADJISKY
BY
ATTORNEYS

April 23, 1935.　　J. N. HADJISKY　　1,998,671
INSULATING AIR CELL
Original Filed Jan. 16, 1933　　7 Sheets-Sheet 2
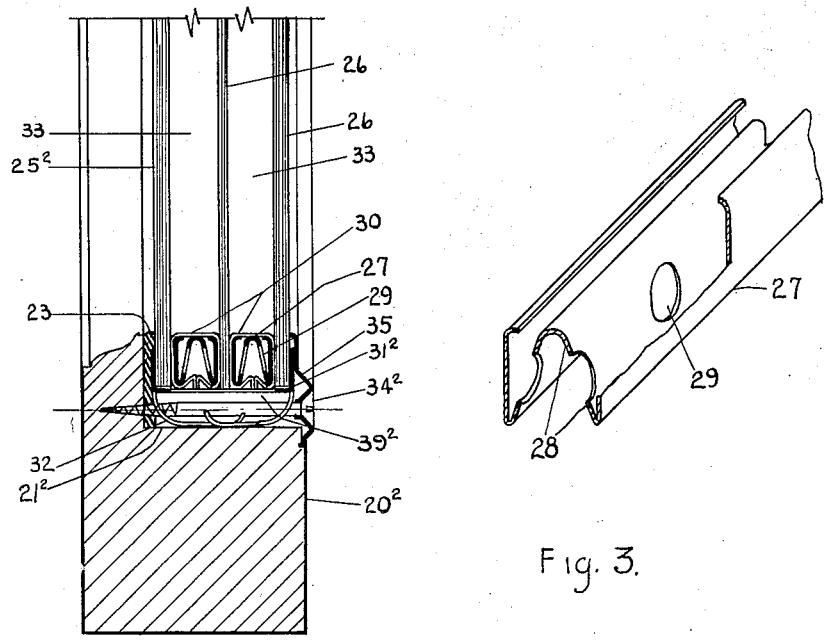
Fig. 8
Fig. 3.
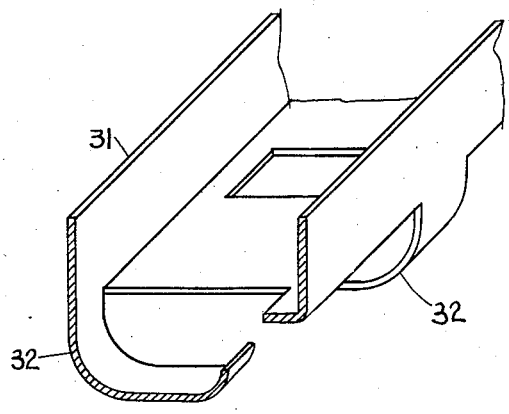
Fig. 4.
INVENTOR.
JOSEPH N. HADJISKY
ATTORNEYS April 23, 1935.  J. N. HADJISKY  1,998,671
INSULATING AIR CELL
Original Filed Jan. 16, 1933  7 Sheets-Sheet 3

INVENTOR.
JOSEPH N. HADJISKY
BY Swan, Frye & Hardesty
ATTORNEYS

April 23, 1935.   J. N. HADJISKY   1,998,671
INSULATING AIR CELL
Original Filed Jan. 16, 1933   7 Sheets-Sheet 4

INVENTOR.
JOSEPH N. HADJISKY
BY Swan, Trye & Hadditty
ATTORNEYS

April 23, 1935.     J. N. HADJISKY     1,998,671
INSULATING AIR CELL
Original Filed Jan. 16, 1933     7 Sheets-Sheet 5

INVENTOR.
JOSEPH N. HADJISKY
BY
ATTORNEYS

April 23, 1935.    J. N. HADJISKY    1,998,671
INSULATING AIR CELL
Original Filed Jan. 16, 1933    7 Sheets-Sheet 7

INVENTOR.
JOSEPH N. HADJISKY
BY
ATTORNEYS

Patented Apr. 23, 1935

1,998,671

UNITED STATES PATENT OFFICE 1,998,671

INSULATING AIR CELL

Joseph N. Hadjisky, Birmingham, Mich.

Application January 16, 1933, Serial No. 651,931
Renewed October 19, 1934

13 Claims. (Cl. 20—56.5)

This invention relates to transparent insulating media in the nature of multiple glazed windows, and has for an important object provision of windows incorporating one or more insulating air cells and so designed and constructed as to provide increased heat insulating characteristics which are maintained at full efficiency practically indefinitely, and in which dimensional variations between the glass and frame, caused by temperature or humidity changes, warping or bending of the frame, cannot destroy the efficiency of the cell or dangerously strain the glass.

A further object is provision of a multiple glazed window structure which is tightly sealed against both the passage of air and material escape of heat therethrough, and in which the glass is so mounted and the sealing so effected that jarring or vibration of the window cannot injure either the seal or the glass.

Still another object is the provision of multiple glazed windows in which the glass panes are rigidly held in spaced relation in a single frame but are easily and quickly removable and replaceable with the aid of no tools other than a screwdriver.

A still further object is the provision of such a multiple glazed window so constructed that condensation upon the interior surfaces of the panes is impossible, and in which dirt is also prevented from entering the spaces between the panes despite—which is a further object—the provision of breathing means adapted to relieve unwanted pressures upon the glass.

The provision of such a structure having great insulating efficiency yet very compact is a further object, as is also an insulating multiple glazed window which may be of large area without danger of building up dangerous pressures upon the glass. In this connection it should be noted that this has long been a desideratum in insulating windows, inasmuch as those heretofore developed which possessed high insulating efficiency, and were capable of retaining it, were not only relatively bulky, but their size as to frontal area was strictly limited because of the unavoidable pressures resulting from the practice of sealing the air cell. My invention, however, contemplates regulated guiding of these troublesome forces rather than an attempt to completely restrain them, and it will be seen that in this manner I am enabled to do away with the massive and high-pressure-resistant structures heretofore used and which limited the application of efficient insulating windows to refrigerators, show cases, and the like.

Other objects and advantages will be apparent from the following description, wherein reference is made to the accompanying drawings illustrating preferred embodiments of my invention, and wherein similar reference numerals designate similar parts throughout the several views.

In the drawings:

Figure 3 is a perspective view of a fragment of a combined cushioning and sealing member;

Figure 4 is a perspective of a fragment of one of the channel-like retaining clips;

Figure 8 is an enlarged fragmentary section of a somewhat modified construction containing additional air cells;

Figures 1, 2:
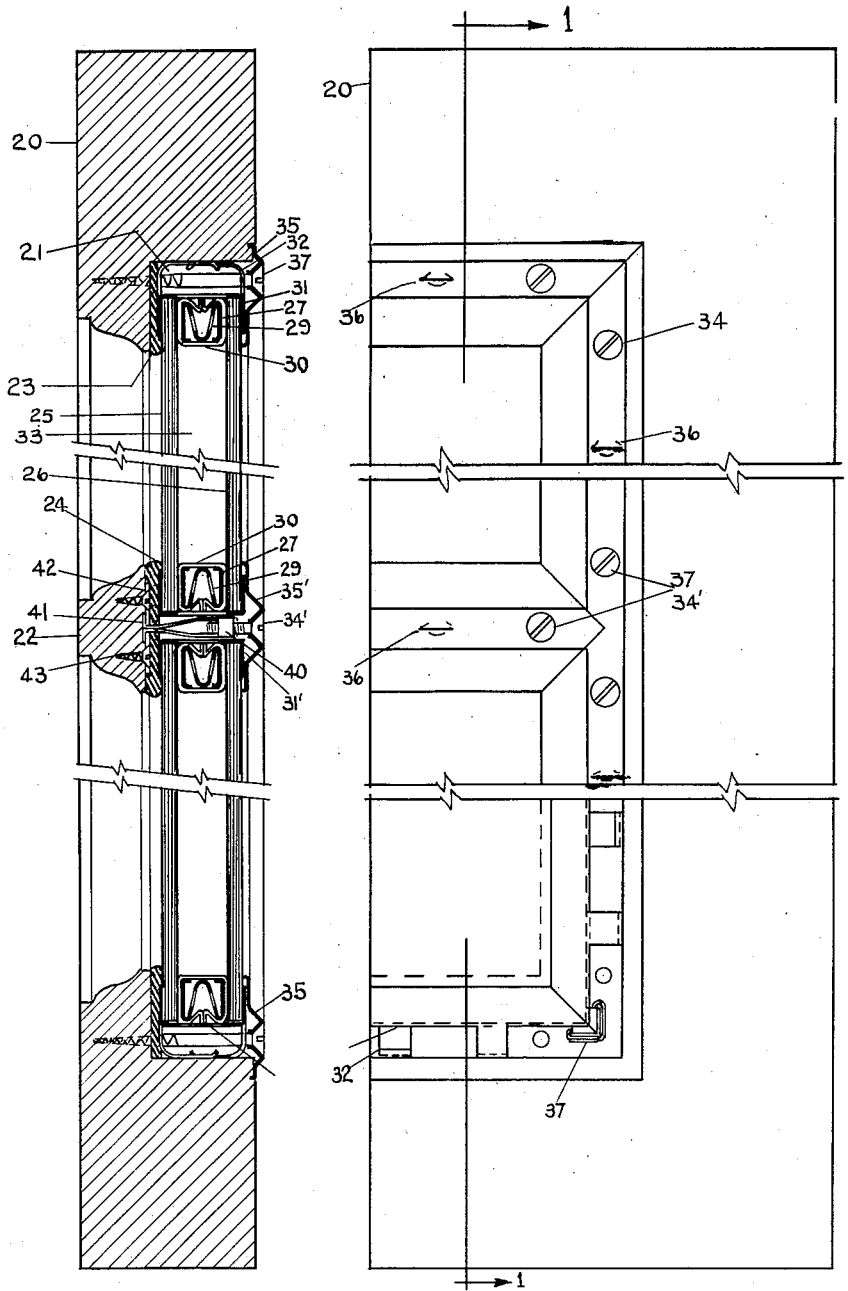
Figure 1 is a fragmentary front elevational view, partially cut away, of a window glazed in accordance with my invention.
Figure 2 is a vertical section taken substantially on the line 2—2 of Figure 1 and looking in the direction of the arrows.
Figures 5, 6:
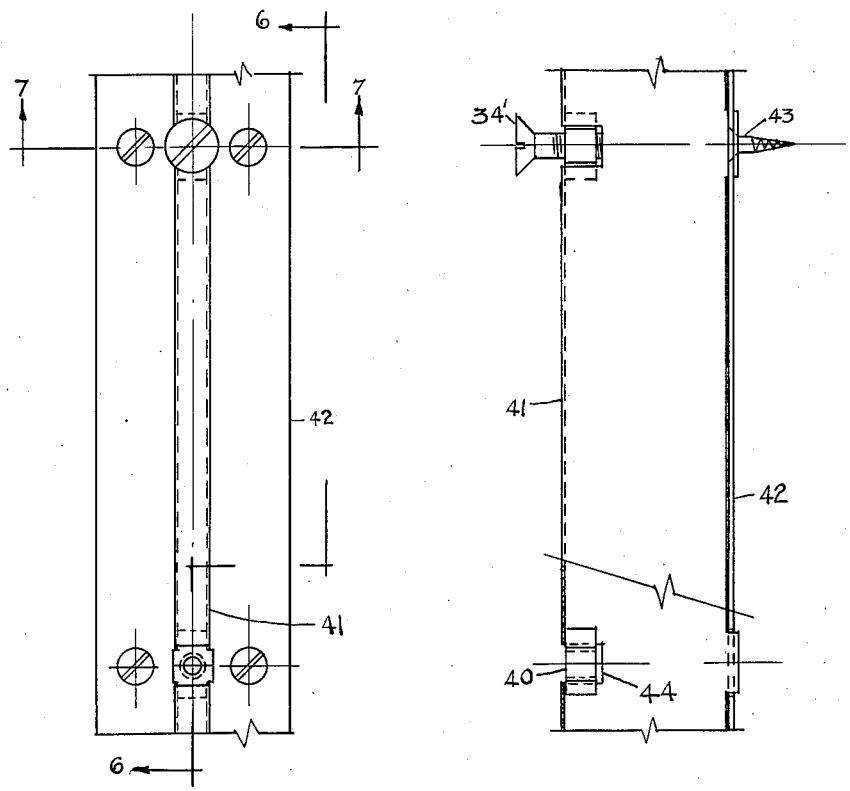
Figure 5 is an enlarged elevational view of a portion of the muntin.
Figure 6 is a side elevational view thereof partly broken away.

Referring now to the drawings: Reference numeral 20 designates a window frame, which, although in the particular design shown is preferably constructed of wood, might by obvious modification be formed of metal or other suitable material. A continuous rabbet 21 surrounds both window openings upon the inside of the frame, the depth of the rabbet being such as to adapt it to receive a glazed air cell, the construction of which, subsequently to be described, forms the most important element of the invention. The window frame shown in Figures 1 and 2 is divided across its middle by a muntin or mullion 22, the rear surface of which may, as shown in Figure 2, be flush with the bottom of the rabbet.

In the construction shown in Figures 1 to 7 inclusive, two separate air cells are employed, one occupying substantially each half of the window and their abutting edges meeting at the muntin. About the entire bottom surface of the rabbet is laid a gasket 23 of relatively soft rubber, which may tightly join another gasket strip 24 extending across the flush surface of the muntin.

Between the two panes 25—26 of each cell, and extending completely around and near the edge, is a combined cushioning, sealing and filtering frame. If the glass, as shown, is rectangular, each frame may be made of four straight strips of resilient sheet metal 27, preferably bent as best shown in Figure 3, although it will be apparent that the metal might be folded a greater or lesser number of times if desired. The two sides of this sealing member lie along the glass and are preferably substantially parallel. They may also be rounded at the corners to prevent injury to the subsequently applied felt casing 30. In the reentrant angular portion 28 a number of holes are punched, as 29. The tubular felt casing 30 may be sewn over the frame-like rectangular assembly of the four members 27, which are miter-fitted, and the felt may be continuous, so that the closed resilient frame is provided with continuous felt surfaces. The manner in which the frame is positioned between the panes of glass is clearly shown in Figure 2, and the arrangement will be seen to be such that the apertures 29 provide communication between the outside and the enclosed cell space between the panes, although air passing therebetween is filtered by the felt.

To retain the cells in unitary assemblies and keep the spring members 27 somewhat compressed, and so the glass and felt in tight engagement, a plurality of retaining channels as 31 may be employed. The distance between the side flanges of the channels is such with relation to the thickness of the glass and of the cushioning and filtering frames, that the panes must be somewhat pressed together and the spring members 27 so compressed before the channels can be forced over the edges of the glass, while when so positioned, the channels retain each pair of glass panes and interposed cushioning frame in the assembled relation shown in Figure 2. From the cross web of each of the channels which lies in the rabbet 21, a plurality of tangs or prongs as 32 may be struck out and contoured to act as cushioning springs. When the cells are inserted in the frame the spring prongs 32 frictionally bear against the sides of the rabbet to yieldably space the cell therefrom, as well as to provide an air channel (designated 39) surrounding the cells. With channel 39, as above noted, the space 33 within each cell communicates through the apertures 29 and felt 30.

Along the muntin edge of each cell the channels, designated 31', may be formed of simple U-contour, no springs as 32 being provided. This permits fitting the abutting cushioning frames and securing channels which lie along the muntin closely enough together so that a narrow mullion can be used without the channels or cushioning frames projecting into view beyond its side edges. At their meeting corners the channel members 31—31' may be mitered to fit tightly together, as shown in Figure 1 and secured by means of angle clips (37) having inbent ends adapted to engage the prongs 32 nearest the corners. The prongs may be bent down after the clips are attached.

Around the outer rabbeted edge the cells are secured in place by means of screws 34 which extend through suitable holes (undesignated) in the securing or bezel strips 35. At suitable intervals along strips 35 filtering apertures as 36 are punched. These may be in the form of downwardly opening louvres contoured to shed water and other foreign matter.

Figure 7:
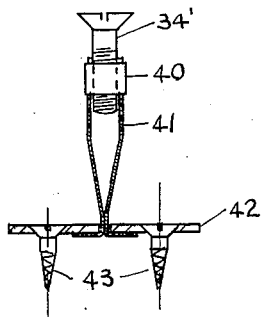
Figure 7 is a sectional view of one of the supports carried by the muntin, but shown removed therefrom, taken as if on line 7—7 of Figure 5 and looking in the direction of the arrows.
Figure 9:
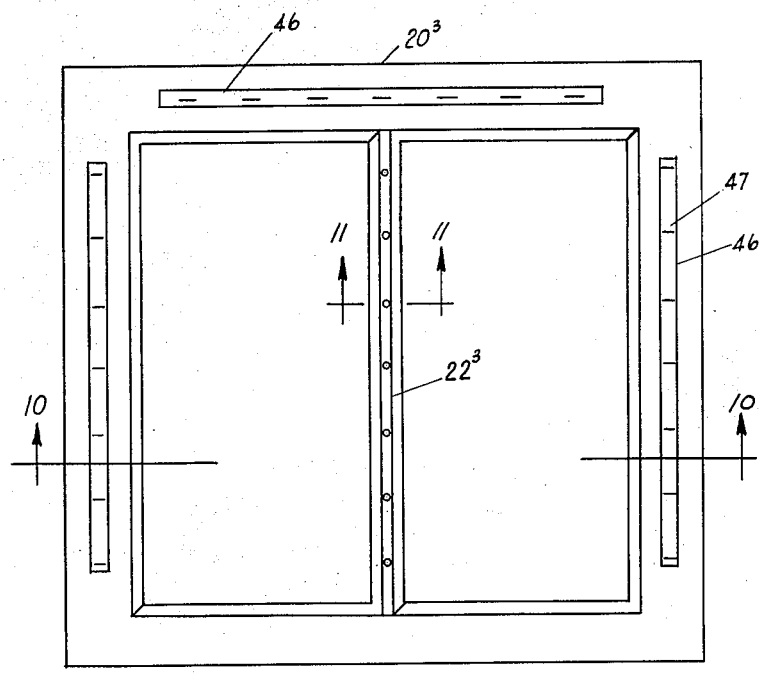
Figure 9 is a front elevational view of a somewhat modified embodiment adapted for use in remodeling conventional window frames.
Figure 10:
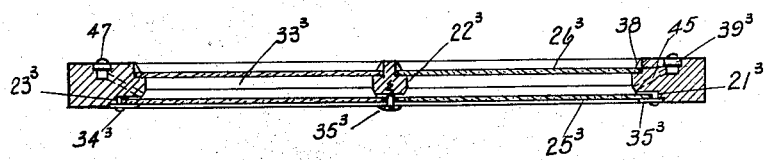
Figure 10 is a transverse section thereof taken substantially on the line 10—10 of Figure 9 and looking in the direction of the arrows.

Along the muntin, in order to avoid the use of long screws extending through the entire thickness of the cell structure and into the wood, which would necessitate spacing the abutting cells a greater distance apart than is desired, special tapped blocks as 40, carried by flat and parallel sheet metal supports 41, may be used. As shown in Figure 7 the latter are supported from a plate 42 fastened to the muntin beneath the gasket strip 24 as by wood screws 43. If then the abutting channel members are cut away, as at 44 (Figures 5 and 6) to accommodate the wider upper portion of each of these securing assemblies, a closer spacing of the abutting cells than would otherwise be possible is permitted. Machine screws as 34' are screwed into the blocks 40 40 through a securing strip 35' extending across the mullion.

The assembly may be enlarged to multiple cell thickness by the similar insertion of one or more additional air cells. In Figure 8 one more cell has been added, which is formed by providing a deeper rabbet, ($21^2$) a wider but analogously formed channel member ($31^2$) and an extra pane of glass, between which and the other two an additional cushioning frame is inserted in the manner shown. Both cells are in communication with the channel $39^2$ surrounding the entire cell structure, the communication being similarly through the apertures 29 and felt filtering jackets 30.

Figure 11:
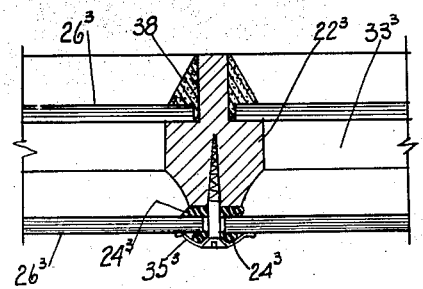
Figure 11 is an enlarged transverse section taken substantially on the line 11—11 of Figure 9 and looking in the direction of the arrows.
Figure 12:
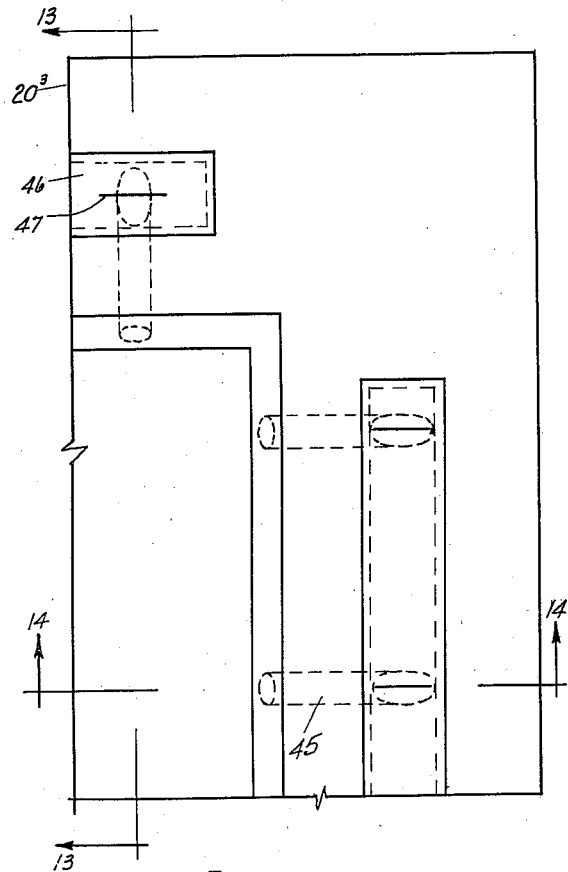
Figure 12 is an enlarged fragmentary front elevational view of a corner of the window shown in Figure 9.
Figure 13:
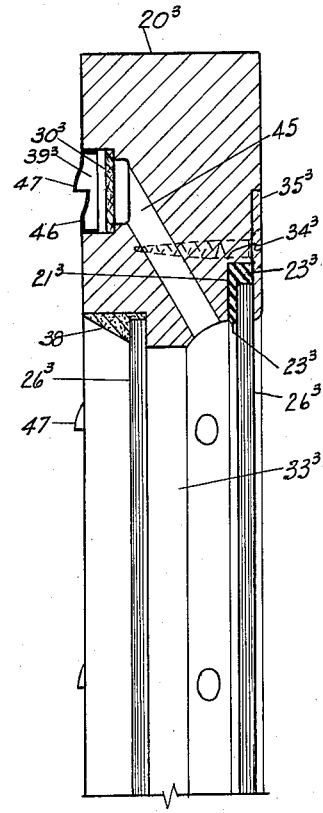
Figure 13 is an enlarged detail section taken substantially on the line 13—13 of Figure 12 and looking in the direction of the arrows.
Figure 14:
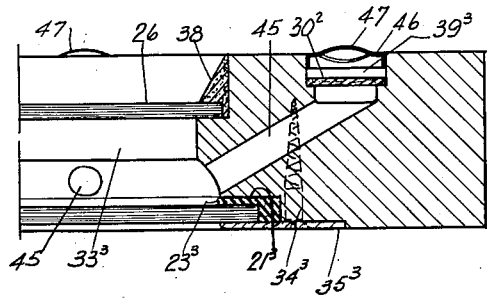
Figure 14 is a detail horizontal section taken substantially on the line 14—14 of Figure 12 and looking in the direction of the arrows.

It will be appreciated that window structures of the types just described necessitate, as a practical matter, special construction of the window frame in which the air cells are incorporated. If it is desired to remodel a conventional or already installed glazed window in order to obtain most if not all of the benefits of the embodiments first described, this may be done in the fashion illustrated in Figures 9 to 14 inclusive. In these figures a wooden window frame $20^3$ having a vertical muntin or mullion $22^3$ is shown by way of example, the outer glass panes $26^3$ being shown secured in place by means of putty 38 in the conventional manner. This glass may be left in place, while upon its inner surface the frame is provided with a special rabbet as at $21^3$ adapted to receive an auxiliary glass pane as $25^3$ for each cell. Beneath and about the edges of panes $25^3$ in rabbet $21^3$ is a continuous soft rubber gasket $23^3$. The inner or house surface of the mullion is planed down flush with the bottom of the rabbet 21³. Bezel plates 35³ secured in place by screws 34³ hold the panes 25³ and gaskets in place, a double channeled gasket as 24³ similarly secured being used along the mullion, as shown in Figure 11.

In the frame and preferably along substantially the entire length of the glass on at least three sides of the frame, ventilating channels 39³ are cut. These communicate with the cell space 33³ between the panes, as by means of apertures 45. Between the channels 39³ and the outside air, to which the channels open, felt filtering strips as 30³ may be interposed, comprising flat pieces of felt fitted across the channels. These may be secured in place and the channel finished by stapled sheet metal cover plates 46 having louvred apertures 47 therein.

Figure 16:
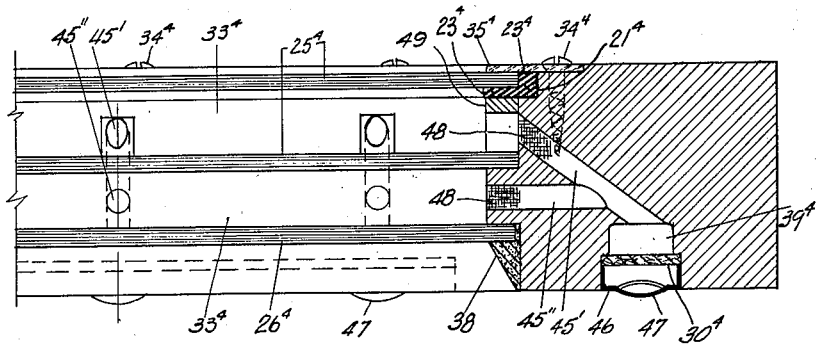
Figure 16 is a sectional view similar to Figure 8, taken substantially on line 16—16 of Figure 15.
Figure 15:
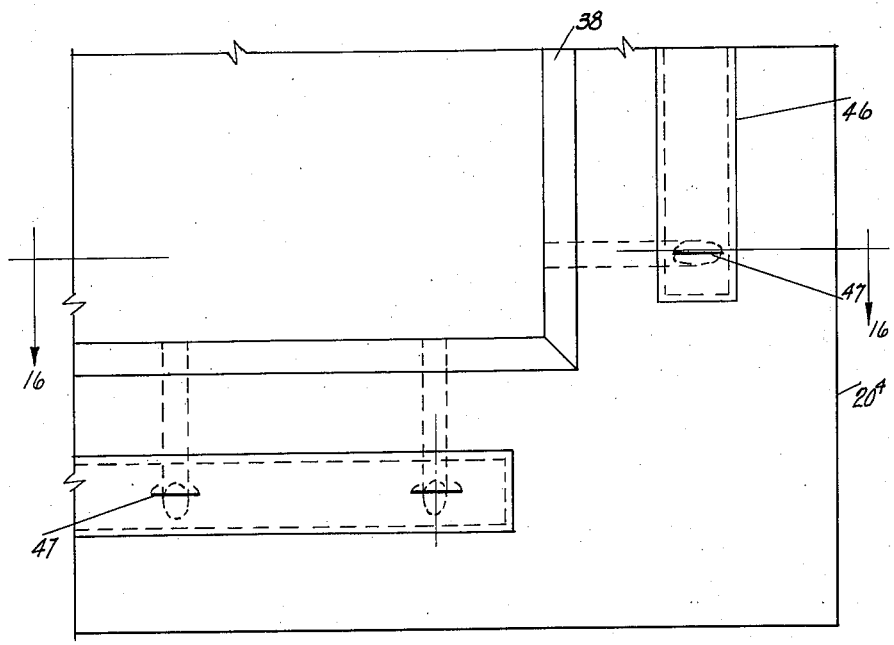
Figure 15 is a fragmentary front elevation of another modification incorporating two air cells.

As shown in Figures 15 and 16 such a construction may be enlarged into a structure of double cell thickness quite simply, as shown in Figs. 15 and 16, the inside of the rabbet being deepened to accommodate two spaced inner panes 25⁴, 25⁴¹, between which is arranged a spacer 49 and at least one of which panes is secured in place by a rubber gasket as 23⁴, while channels 45'—45'' are provided communicating with both cell spaces and connecting them with the outwardly opening channel 39⁴. Additional filter plugs as 48 are inserted in one or both of the channels 45'—45'' to reduce convection-induced circulation between cells, the resistance of these additional filters being sufficient to resist any pressure caused by temperature-induced weight differential between the air columns in the cells (likely to be met in service) but not so great as to prevent molecular diffusion of the water vapor or to materially restrict aspiration caused by expansion and contraction of air within the cells.

Figure 18:
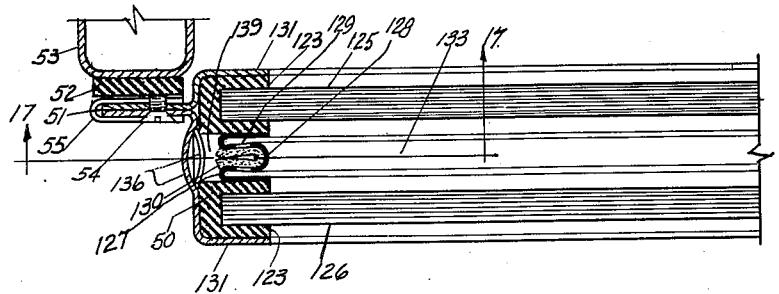
Figure 18 is a section substantially on line 18—18 of Figure 17 and looking in the direction of the arrows.
Figure 17:
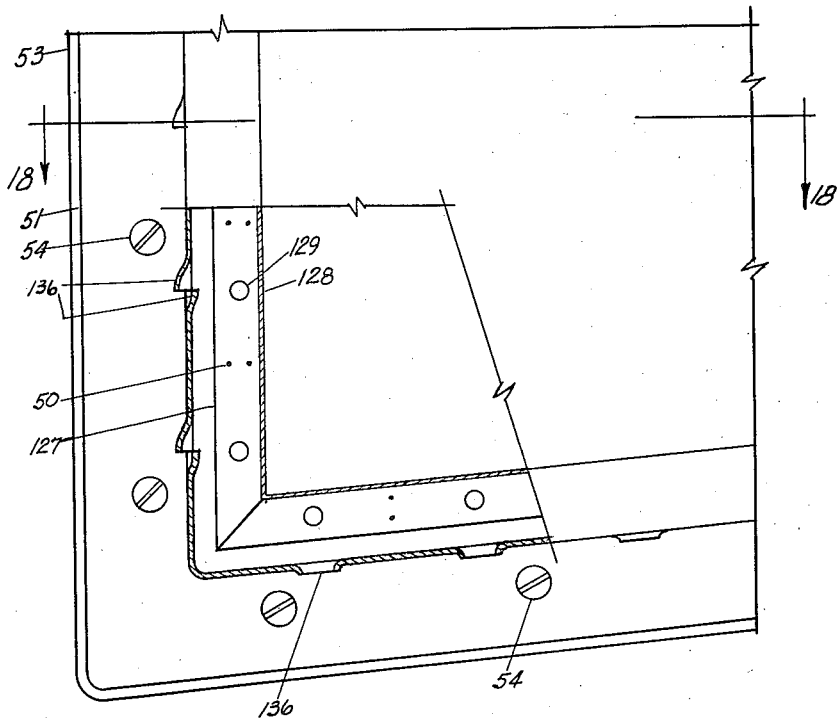
Figure 17 is a fragmentary front elevation of another modified embodiment adapted particularly for use in vehicles.

Figures 17 and 18 show another modification particularly adapted for use in steel sash or automobile windshields, an exemplary windshield construction being shown. Here the retaining channel 131 also constitutes the window frame, and between it and the spaced glass panes 125—126 relatively thick soft rubber channeled gaskets as 123 are interposed, which yieldably support the panes and seal their edges. Additional tension is provided by a combined spring and filter unit formed of a longitudinally folded spring metal strip 127, the outer substantially parallel faces of which are provided with positioning prongs 50 adapted to hold it in position relatively to the gaskets. The central double folded portion 128 is apertured as at 129 and a felt filter strip 130, folded and held in place by the spring tension of this portion of strip 127, serves to restrict communication between the cell space 133 and the open air, with which the channel 139 surrounding the spring and filter assembly is placed in communication by louvred apertures 136. The filter strip may be impregnated with a non-volatile oil to prevent absorption of water and entrap fine dust particles.

As shown in Figure 18 frame member 131 may be made in separate front and rear sections carrying aligned meeting flanges 51. The flanges are secured together and so the entire assembly held by channel irons 55, locked in place by screws 54. It will be seen that by removing the screws and channels the construction may easily be disassembled for such purposes as the replacement of broken glass. A weather strip 52 is shown interposed between the side flange of the windshield and the post 53, which represents the corner post of a vehicle (not shown). Obviously, however, the side flanges might be arranged to be vertically slidable in channeled guides or the like in a slidable window or windshield, or arranged in any other suitable manner.

All of the described constructions will be seen to be so designed that air leakage around edges of the inner glass and into the cell space between the panes is a virtual impossibility. If a small amount of leakage occurs around the frame, this is relatively unimportant, except as regards heat loss, whereas, if the leakage occurred around the edges of the glass so that air from inside the house could enter the cell space, condensation upon the inner glass surfaces would be unavoidable in wintertime, since the air inside a house or vehicle has almost invariably a much higher absolute moisture content than the outside air. As a result, in ordinary double glazed windows which allow air to leak into the cell space from inside the house, upon such air being cooled in the cell space by exposure to the cooled outside pane, its relative humidity frequently rises to saturation, and condensation results. Any such possibility will be seen to be eliminated by absolute sealing of the inner pane in the ways disclosed herein, (note the sealing of panes 25, 25', 25², 25³, 25⁴, and 125) so that no air leakage from inside the house into the cell space 33 can occur. Any air from the house which may leak to the outside around the frame and into the cell space will be so trifling in amount, and so diluted and dehumidified by contact with outside air, as to be unable to supply a perceptible amount of condensible moisture. Since the cell space is permitted to breathe, temperature variations cannot cause the exertion of dangerous pressures upon the glass, while the restriction offered by the filtering members not only prevents dirt from entering the spaces between the panes but so reduces air circulation as to prevent undue cooling of this space while permitting adequate molecular diffusion through the felt, so that the escape of water vapor is facilitated when the partial pressure of the water vapor inside the air cell becomes greater than that in the air outside.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In an air cell structure adapted to be exposed on one side to air having a lower moisture content than air on the other, a frame having an opening therein, a plurality of spaced panels arranged in the opening, one panel being substantially hermetically sealed therein to prevent air leakage between one side of the frame and the space between panels, and another panel having appurtenant vents connecting said space and the other side of the frame.

2. In an air cell structure, a frame, a plurality of panels supported thereby, at least one being substantially hermetically sealed therein, means for securing both panels in the frame, and means having restricted apertures therein for spacing the panels.

3. In an insulating air cell structure, a frame, and a plurality of spaced panels carried thereby, one tightly sealed in the frame and the other restrictedly permeable.

4. In an insulating air cell structure, a frame, a plurality of spaced panels carried thereby, one being tightly sealed in the frame to prevent communication between one side and the space between the panels, a portion carried by the frame having also an aperture therein connecting said space and the other side of the frame, and a filtering member in said aperture.

5. In an insulating air cell structure, a frame, a plurality of spaced panels therein, means securing the panels in a unitary assembly, and means yieldably and movably supporting the assembly in the frame.

6. In an insulating air cell assembly, a plurality of substantially aligned stacked cells including spaced parallel panels defining the same, means providing restricted communication between each cell and one side of the assembly, apertured means providing communication between the cells, and means restricting airflow through said last mentioned means.

7. In an insulating air cell structure, a plurality of spaced substantially parallel panels, a frame for clampingly supporting the panels, said frame comprising separable sections, means for securing the sections together, and means for spacing the panels including a resilient spacer element arranged between and extending peripherally about and near the edges of said panels, said spacer panels being laterally apertured to provide communication between the space between the panels and the outside, and a restrictedly permeable filter member extending about the spacer element and covering the apertures therein.

8. In an insulating air cell structure, a plurality of spaced substantially parallel panels, a frame for supporting the panels, resilient spacer means between the panels and extending peripherally thereof, said spacer means being laterally apertured to provide communication between the space between the panels and the outside, a restrictedly permeable filter member extending around the spacer means and between said means and the panels and covering said apertures, and means for clamping the panels against said filter member and the opposite sides of the spacer means.

9. In an insulating air cell structure, a plurality of spaced panels, a frame for supporting the same, an apertured spacer between the panels, and filtering means carried by said spacer member and comprising a permeable membrane extending around the spacer member and guarding the apertures therein.

10. In an insulating air cell structure, a frame, a plurality of spaced panels carried thereby and defining a cell, one of said panels being sealed in the frame, and the frame having apertures therein communicating with the cell space, and a portion also carried by the frame having a filtering chamber therein and connected to said apertures.

11. In an air cell construction, a frame having inner and outer surfaces and an opening extending therethrough, a panel substantially hermetically sealed in said opening, another panel also arranged in said opening and spaced from the first, spacer means for holding the panels in desired spaced relation comprising a resilient element arranged between the panels and extending peripherally thereabout near the edges thereof, said element having a plurality of openings extending laterally therethrough to provide communication between the space between the panels and the outside, means providing communication between said openings and the outer surface of the frame, and restrictedly permeable filter means guarding said openings.

12. In an air cell construction, a frame having inner and outer surfaces and an opening extending therethrough, a panel substantially hermetically sealed in said opening, another panel also arranged in said opening and spaced from the first, spacer means for holding the panels in desired spaced relation comprising a resilient element arranged between the panels and extending peripherally thereabout near the edges thereof, said element having a plurality of openings extending laterally therethrough to provide communication between the space between the panels and the outside, means providing communication between said openings and the outer surface of the frame, and filter means guarding said openings comprising a restrictedly permeable element held under compression by said spacer element and covering the openings therein.

13. In an air cell structure adapted to be exposed on one side to air having a lower moisture content than air on the other, a frame having an opening therein, a plurality of spaced panels arranged in the opening, one panel being substantially hermetically sealed therein to prevent air leakage between the space between the panels and the side on which the air is of higher moisture content, and another panel having appurtenant vents connecting said space and the side on which the air is of lower moisture content.

JOSEPH N. HADJISKY.